M. J. MURPHY.
INDICATOR FOR VEHICLES.
APPLICATION FILED JUNE 30, 1917.
1,289,232.
Patented Dec. 31, 1918.
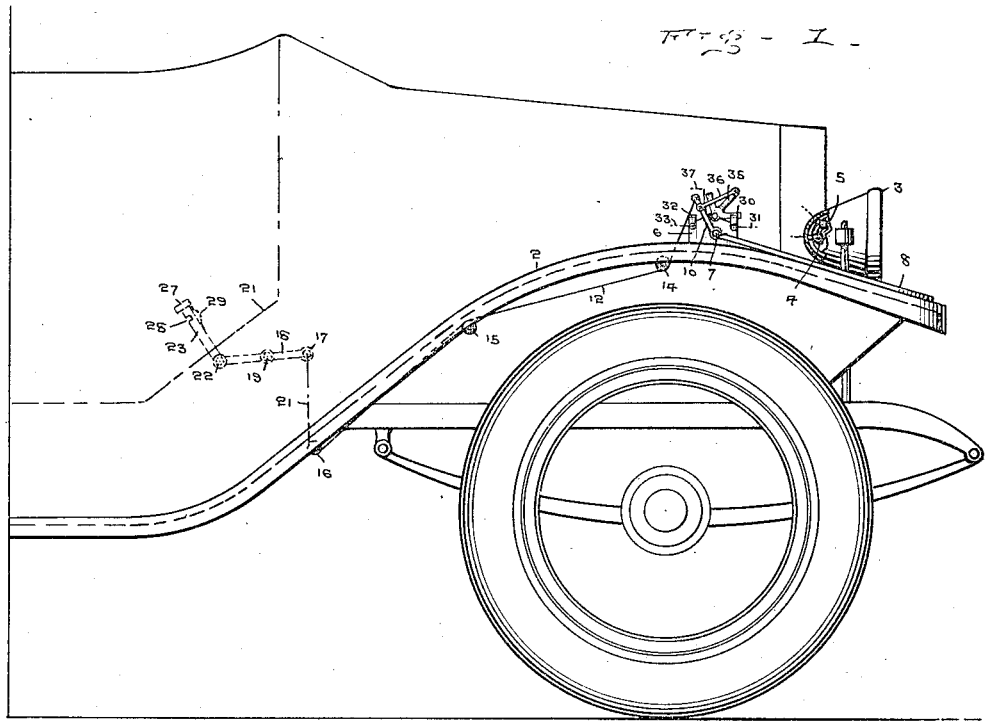
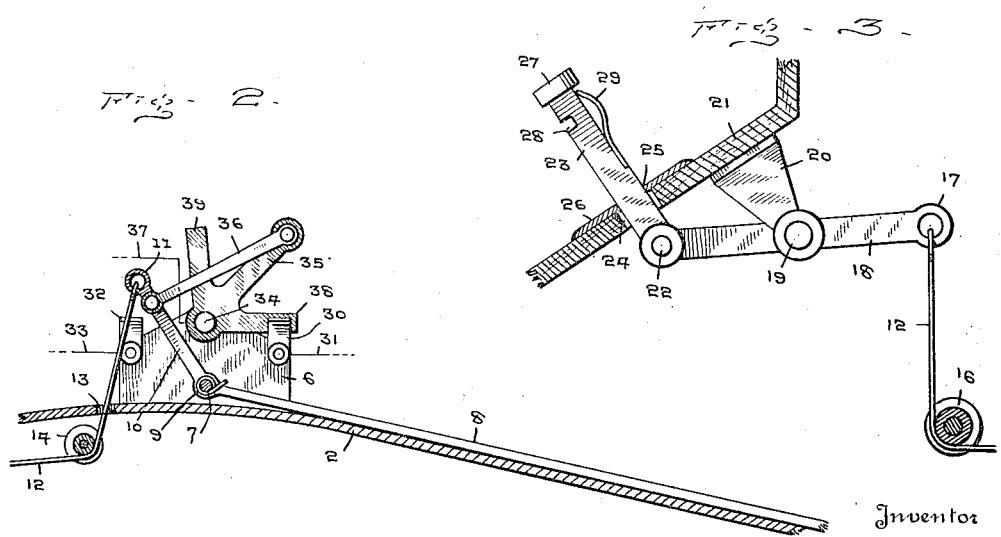
Inventor
M. J. Murphy
By W. J. FitzGerald
Attorneys

UNITED STATES PATENT OFFICE.

MICHAEL J. MURPHY, OF PORTLAND, OREGON.

INDICATOR FOR VEHICLES.

1,289,232.  Specification of Letters Patent.  Patented Dec. 31, 1918.

Application filed June 30, 1917. Serial No. 177,909.

*To all whom it may concern:*

Be it known that I, MICHAEL J. MURPHY, a citizen of the United States, residing at Portland, in the county of Multnomah and State of Oregon, have invented certain new and useful Improvements in Indicators for Vehicles; and I do hereby declare the following to be a full, clear, and exact description of the invention, such as will enable others skilled in the art to which it appertains to make and use the same.

This invention relates to a new and improved indicator for vehicles, and more particularly to a device for use upon automobiles and the like for giving warning to pedestrians and drivers of other vehicles of the proposed direction that the driver of the vehicle carrying the device of this invention intends to travel.

Another object of this invention is the provision of a device of this character provided with means whereby a signal can be displayed either by day or by night for indicating to others whether the vehicle is to pursue a straight course or will turn to the right or the left.

Another object of this invention is to provide a device capable of being readily installed upon any of the automobiles and like vehicles now in use or which can be built in the automobiles or vehicles during the course of construction, and which device can be readily operated by the operator of the vehicle without having to leave his seat.

Another object is to produce a device of this character which is simple in construction, consisting of few parts, efficient and durable, and economical to manufacture.

These and other objects and advantages will more fully appear as the nature of the invention is more clearly understood from the following description taken in connection with the accompanying drawings wherein there is disclosed one embodiment of the invention, but which is susceptible to numerous variations and alterations therein to meet the exigencies of the case without departing from the spirit of the invention or exceeding the scope of the appended claims.

In the drawings:

Figure 1 is a side view of the front portion of an automobile showing the invention in applied operative position thereon.

Fig. 2 is a detail sectional view of a portion of the mechanisms employed.

Fig. 3 is a similar view of certain other mechanisms employed.

I desire to here state that for the sake of clearness and illustration of my invention I have herein disclosed and will hereinafter describe the novel mechanisms for displaying a signal or indicator at the right hand side of the vehicle, but it is to be understood that I employ a duplication of the parts at the left hand side of the vehicle both of which can be readily operated by the feet of the driver of the vehicle.

Referring to the drawings, wherein similar reference characters denote corresponding parts throughout the several views, 1 denotes the automobile, 2 the running board, mud guard or fender, and 3 the head light provided with the usual white bulb 4, and I also mount within the head light 3 the red bulb 5 at any suitable point therein but preferably in proximity to the usual white bulb 4.

Suitably mounted upon the fender 2 is the support 6, preferably in proximity to the head light 3 and the forward end of the fender 2, and pivotally mounted upon the support 6, as by the rod or bolt 7 or other suitable securing means is the paddle or semaphore 8, preferably flat and narrower at its pivotal point than at its outer end, and surrounding the pivot bolt 7 and having its ends suitably secured to the support 6 and the semaphore 8 is the recoil spring 9 for maintaining the semaphore 8 in inoperative position upon the forward upper surface of the fender 2. Formed upon the inner end of the semaphore 8 is the semaphore actuating arm 10 preferably disposed in obtuse angular relation to the semaphore 8 and connected to the loop or eye 11 of the arm 10 is one end of the cable 12 which passes downwardly through the opening 13 formed in the fender 2 and thence around and beneath the pulley 14 suitably secured upon the under side of the fender 2 or upon any other suitable support, the cable 12 thence passing over the pulley 15 and onwardly around and beneath the pulley 16, the pulleys 15 and 16 being supported like pulley 14. The cable 12, which may be formed of any suitable material, extends from the pulley 16 and has its free end suitably secured to the loop or eye 17 of the rocking bar 18 which is centrally pivoted as at 19 upon the bracket 20 suitably secured to the under side of the foot board 21 of the vehicle, and pivotally connected to the opposite end of the rocking bar 18 as at 22 is the lower end of the foot operated plunger rod 23 preferably rectangular in cross section and which projects upwardly through the opening 24 in the foot board 21 and one of the openings 25 of the retaining or locking plate 26 suitably secured upon the upper side of the foot board 21 and having its opening 25 in registration with the opening 24 in the foot board 21. The plunger rod 23 is provided with the head 27 and in one side edge of the plunger rod 23 and at the suitable distance below the head 27 is the notch 28 and into which becomes seated the adjacent edge of the opening 25 when the plunger rod 23 has been depressed by the operator of the machine, and for maintaining the notch 28 and the co-acting edge of the opening 25 of the plate 26 into secured locked position with each other is the leaf spring 29 suitably secured upon the edge of the plunger rod 23 opposite to the edge having the notch 28 whereby the leaf spring 29 engages the opposite edge of the opening or slot 25 of the plate 26 so that the leaf spring 29 will maintain the notch 28 in engagement with the adjacent edge of the opening or slot 25 of the retaining plate 26.

Interposed in the usual lighting system of the vehicle is a double acting switch adapted to be actuated simultaneously with the actuation of the semaphore 8, and consists in providing upon the support 6 the contact 30 connected by the wire 31 to the white bulb 4 of the head light 3 and also mounted upon the support 6 is the contact 32 connected by the wire 33 to the red bulb 5 within the head light 3. Pivotally mounted upon the support 6 midway between the contacts 30 and 32 and upon the pivot bolt or the like 34 is the double acting switch comprising the actuating arm 35 connected by the pivoted link 36 to the actuating arm 10 of the semaphore 8. The double acting switch is connected by the wire 37 to any suitable source of electrical supply and is provided with the knife member or blade 38 adapted to contact with the contact 30 when the parts are in the position shown in the drawings for establishing connection between the supply wire 37 and the wire 31 connected with the white bulb 4 of the head light 3, it being understood, of course, that the usual cut out switch is in closed position. The double acting switch is also provided with the knife member or blade 39 adapted to contact with the contact 32 when the switch is swung to the left or in the opposite direction to that shown in the drawings, and in this instance a circuit will be established between the supply wire 37 and the wire 33 leading to the red bulb 5 within the head light 3 and the circuit of the white bulb broken for extinguishing the white light.

The operation of the device and the advantageous results attained thereby will be briefly described as follows:

When the automobile or other vehicle, which is provided with my invention, is traveling in the daytime the cut out switch of the usual lighting system is, of course, turned to break the circuit, and the parts assume the position shown in the drawings when the vehicle is traveling ahead in a straight course. Should it be desired to turn the machine to the right and give warning to the public of this intention the operator of the vehicle will press downwardly the right hand plunger rod 23, with his right foot, and this movement of the plunger rod 23 will rock the bar 18 in a manner to exert an upward pull upon the cable 12 which will draw the cable 12 sufficiently for pulling the actuating arm 10 of the semaphore 8 downwardly and thereby swing the semaphore 8 upon its pivot 7 in an upward or substantially vertical position for displaying the semaphore 8 to warn the public of the intention of the driver of the vehicle to turn to the right, and in the mean time the notch 28 of the plunger rod 23 will become locked with the adjacent edge of the retaining plate 26 and thereby retain the semaphore 8 in vertical position as long as desired. At the same time that the semaphore 8 had been thrown into vertical position, the double acting switch through the medium of the connecting link 26 is simultaneously thrown rearwardly, but, of course, there is no circuit established in the red light circuit in the daytime. After the machine has completed its turn to the right and is now traveling in a straight course, the operator will force the head of the plunger rod 23 forwardly against the tension of the spring 29 for unlocking the plunger rod 23 whereby the tension of the spring 9 for returning the semaphore 8 to normal inoperative position will cause the arm 10 to be elevated and exert a pull upon the cable 12 in the opposite direction and maintain the plunger rod 23 in elevated position, and simultaneously the double acting switch will be thrown forwardly, and as before stated the circuit for the white light will not be closed in the daytime.

Should the machine, however, be traveling at night the usual switch in the lighting circuit will be closed and when the semaphore 8 is in inoperative position the blade 38 of the switch will be maintained in constant contact with the contact 30 so that the white light 4 of the head light 3 shines continuously, but when turning to the right at night not only is the semaphore 8 elevated in the manner above described but in addition thereto the switch is simultaneously swung to the left and the blade 39 of the switch will contact with the contact 33 and establish a circuit through the red light 5 and break the circuit of the white light and after the completion of the turn the operator releases the plunger rod 23 as before stated and in this instance the red light circuit is broken and the white light circuit reëstablished.

While the disclosure in the drawings and the description thereof has been confined to the mechanisms for operating the signal or indicator at the right hand side of the machine, it is to be understood, of course, that these parts or elements of construction are duplicated at the left hand side of the machine and operated in the same manner for turning to the left that the mechanisms for turning to the right have been described, the only difference being that the mechanisms at the left of the machine are operated by the left foot of the driver of the machine, a plunger rod similar to the plunger rod 23 passing through a similar slot 25 in the retaining plate 26 and in juxtaposition to the plunger rod 23.

From the foregoing it will be seen that by my invention I am enabled to provide an indicating or signaling device for automobiles and the like which can be readily operated from the seat of the machine for giving notice to the public of the intended course of the vehicle by both day and night and the day signal and night signal being actuated simultaneously with each other and by the same mechanisms, and another advantageous feature of this invention resides in the fact that the indicating or signaling devices are positioned upon the machine at points where they will not interfere with the view of the operator of the machine and at the same time can be readily observed by the public and the operators of approaching vehicles.

While I have shown and described my invention as being applied at the front of the machine, the same is readily adapted to be applied at the rear of the machine for giving warning to drivers of machines approaching from the rear of the direction which the machine having this invention proposes to turn or by attaching duplicated mechanisms at the rear of the machine and connecting another cable to the respective locking arms 18 a signal may be displayed at both the front and the rear of the machine.

Having described my invention, what I claim as new and desire to secure by Letters Patent, is:

1. In a device of the character specified, the combination of a vehicle provided with a fender, a pivoted semaphore adapted to rest upon said fender, a crank arm from said pivot for actuating the semaphore, and means upon said vehicle for operating said crank arm.

2. In a device of the character specified, the combination of a vehicle provided with a fender, a pivoted semaphore adapted to rest upon said fender, a crank arm from said pivot for actuating the semaphore, a bell crank contact member having an operating arm, and a link pivotally connected to said arm and the crank arm of the semaphore.

3. In a device of the character specified, the combination of a vehicle having a fender, a pivoted semaphore disposed to rest upon said fender, a crank arm extending from said pivot, a rock lever mounted upon the vehicle, a plunger connected with one end of said lever, and a flexible connection from the opposite end of said lever to said crank arm.

In testimony whereof I have signed my name to this specification in the presence of two subscribing witnesses.

MICHAEL J. MURPHY.

Witnesses:
W. Q. BUFFINGTON,
BLANCHE VAUGHAN.